(12) United States Patent
Jo et al.

(10) Patent No.: US 10,497,553 B2
(45) Date of Patent: Dec. 3, 2019

(54) TIME VERSUS INTENSITY DISTRIBUTION ANALYSIS USING A MATRIX-ASSISTED LASER DESORPTION/IONIZATION TIME-OF-FLIGHT MASS SPECTROMETER

(71) Applicants: Eung Joon Jo, Old Tappan, NJ (US); Yohahn Jo, Old Tappan, NJ (US)

(72) Inventors: Eung Joon Jo, Old Tappan, NJ (US); Yohahn Jo, Old Tappan, NJ (US)

(73) Assignee: Highland Innovations, Inc., West New York, NJ (US)

( * ) Notice: Subject to any disclaimer, the term of this patent is extended or adjusted under 35 U.S.C. 154(b) by 0 days.

(21) Appl. No.: 15/682,166

(22) Filed: Aug. 21, 2017

(65) Prior Publication Data
US 2018/0053645 A1 Feb. 22, 2018

Related U.S. Application Data

(60) Provisional application No. 62/377,768, filed on Aug. 22, 2016.

(51) Int. Cl.
*H01J 49/40* (2006.01)
*H01J 49/00* (2006.01)
*H01J 49/02* (2006.01)
*H01J 49/16* (2006.01)

(52) U.S. Cl.
CPC .......... *H01J 49/40* (2013.01); *H01J 49/0036* (2013.01); *H01J 49/027* (2013.01); *H01J 49/164* (2013.01)

(58) Field of Classification Search
None
See application file for complete search history.

(56) References Cited

U.S. PATENT DOCUMENTS

| | | | | |
|---|---|---|---|---|
| 2002/0100870 | A1* | 8/2002 | Whitehouse | B82Y 30/00 250/281 |
| 2003/0027231 | A1* | 2/2003 | Bryden | C12Q 1/04 435/7.31 |
| 2005/0263694 | A1* | 12/2005 | Hayek | H01J 49/0036 250/287 |
| 2012/0261568 | A1* | 10/2012 | Coon | H01J 49/0027 250/282 |
| 2013/0274143 | A1* | 10/2013 | Emanuele, II | H01J 49/0036 506/12 |
| 2015/0066377 | A1* | 3/2015 | Parchen | G06K 9/00536 702/19 |
| 2016/0064202 | A1* | 3/2016 | VanGordon | H01J 49/0418 250/282 |

* cited by examiner

*Primary Examiner* — Andrew Smyth
(74) *Attorney, Agent, or Firm* — Daniel H. Sherr, Esq.

(57) ABSTRACT

An apparatus, method, or computer program. spectrometer test data of a sample may be received for processing. The spectrometer test data may include time-of-flight data in units of time and intensity of ionized particles travelling through a flight tube. The spectrometer test data may be matched to a reference library to determine characteristic information of the sample. The reference library may include spectrometer sample data in units of time and intensity of ionized particles of pre-stored reference samples detected by spectrometers in the past. The spectrometer reference data has known characteristics that the matching associates with the received spectrometer test data.

28 Claims, 11 Drawing Sheets

2

Figure 1:
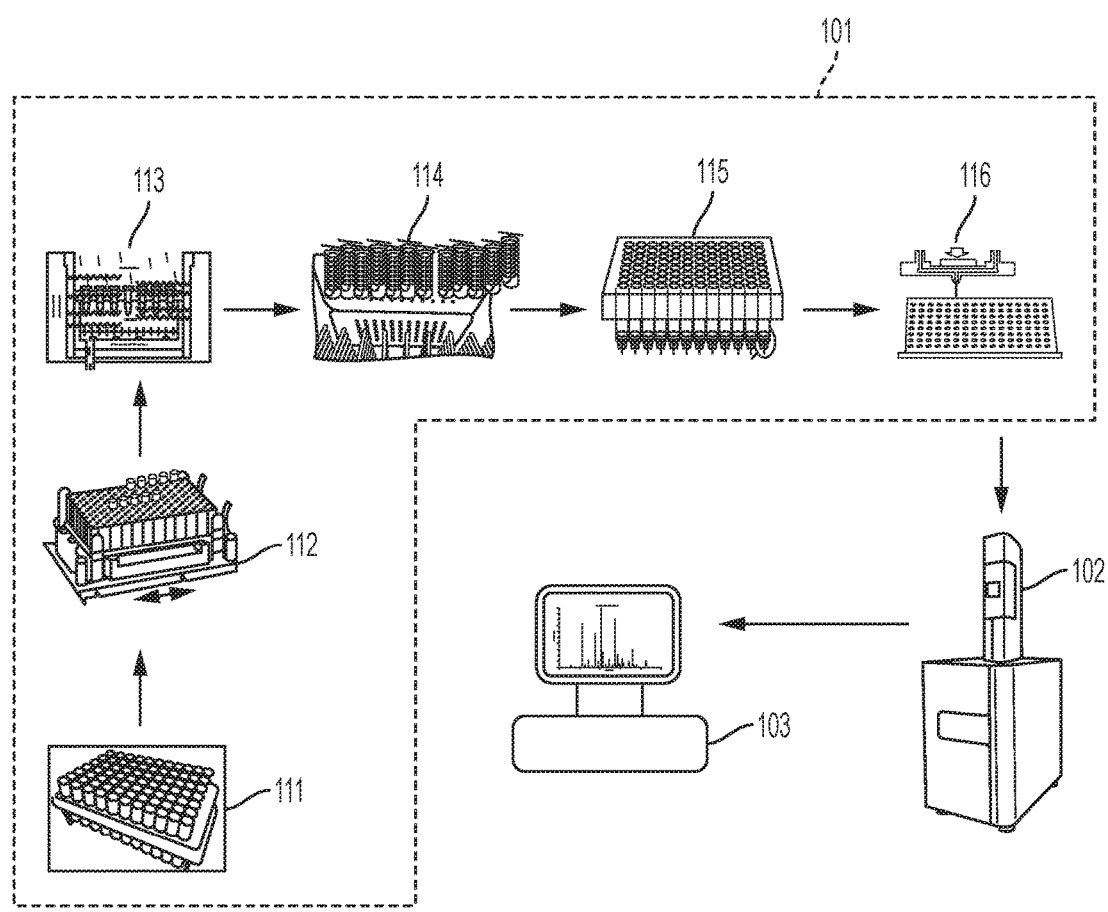

TIME VERSUS INTENSITY DISTRIBUTION ANALYSIS USING A MATRIX-ASSISTED LASER DESORPTION/IONIZATION TIME-OF-FLIGHT MASS SPECTROMETER

The present application claims priority to U.S. Provisional Patent Application No. 62/377,768 filed on Aug. 22, 2016, which is hereby incorporated by reference in its entirety.

BACKGROUND

A Matrix-Assisted Laser Desorption/Ionization Time-Of-Flight Mass Spectrometer (MALDI-TOF MS) is an example of a spectrometer, which is used to detect attributes of a sample. For example, the sample may be human blood and the detected attributes may be diseases or other medical conditions of the person from whom the blood was drawn. There are other applications for spectrometers aside from disease diagnosis.

However, there are challenges in using MALDI-TOF MS for disease diagnostics in a clinical environment. One challenge is that there may be poor reproducibility of mass analysis data. The reproducibility in intensity for each mass-to-charge may be a critical factor for diagnostic accuracy when the diagnostics requires the information about intensity in addition to mass-to-charge information, such as in the case of cancer diagnostics or status check of diseases.

Another cause of the poor reproducibility may be from the MALDI-TOF's intrinsic character in ion optics. A MALDI-TOF MS may be able to analyze samples relatively quickly with high sensitivity. In some circumstances a MALDI-TOF MS may be a relatively poor quantitative analysis tool because all the ionized particles do not have the same initial velocities at the chamber entrance and/or do not travel the same distance in the chamber due to the different incident angles of particles. Accordingly, there may be an inevitable data spread over time lowering data reproducibility.

In some circumstances, after MALDI-TOF MS ionization of a sample, the data is calibrated and adjusted into a mass-to-charge ration (m/z), which may be represented as mass peaks with a statistical variation. When a spectrometer measures the time-of-flight of an ionized particle, the measured time-of-flight can be converted to a mass-to-charge ratio using a quadratic equation. Unfortunately, there is some variation in the time-of-flight of ionized particles due to imperfections of spectrometers. Accordingly, the same types of ionized particles may have a statistically distributed time-of-flight measurement. For spectrometer data to be optimized for matching profiles from a reference library, the statistical variation of time-of-flight measurements should have a minimized standard deviation. When time-of-flight measurements are converted to mass-to-charge ratios using a quadratic equation, the standard deviation of the time-of-flight measurement is compromised, which may make it difficult to associate attributes to a sample (e.g. difficult for a human blood sample to produce a diagnosis in a MALDI-TOF MS).

SUMMARY

Embodiments relate to an apparatus, method, or computer program. In embodiments, spectrometer test data of a sample may be received for processing. The spectrometer test data may include time-of-flight data in units of time and intensity of ionized particles travelling through a flight tube of a spectrometer. The spectrometer test data may be matched to a reference library to determine characteristic information of the sample. The reference library may include spectrometer sample data in units of time and intensity of ionized particles of pre-stored reference samples detected by spectrometers in the past. The spectrometer reference data has known characteristics that the matching operation associates with the received spectrometer test data.

DRAWINGS

Example FIG. 1 illustrates a disease diagnosis laboratory, in accordance with embodiments.

Figure 2:
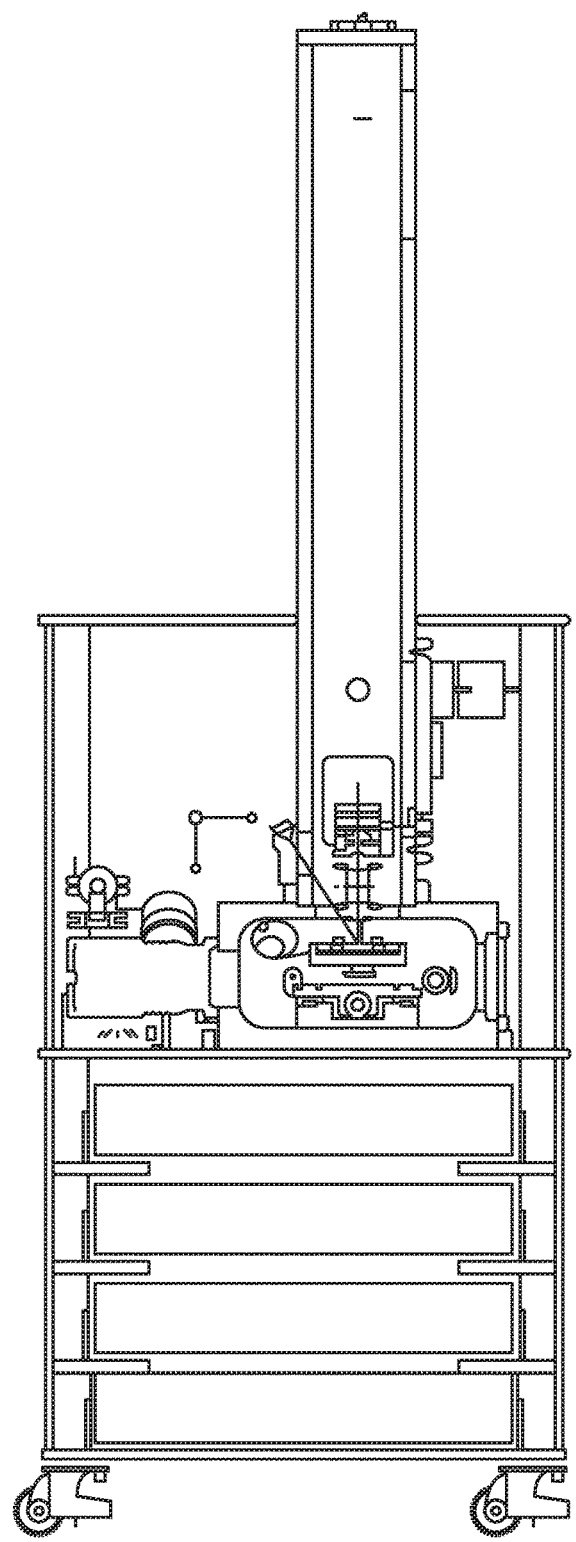

Example FIG. 2 is a schematic view of a MALDI-TOF MS system, in accordance with embodiments.

Figure 3:
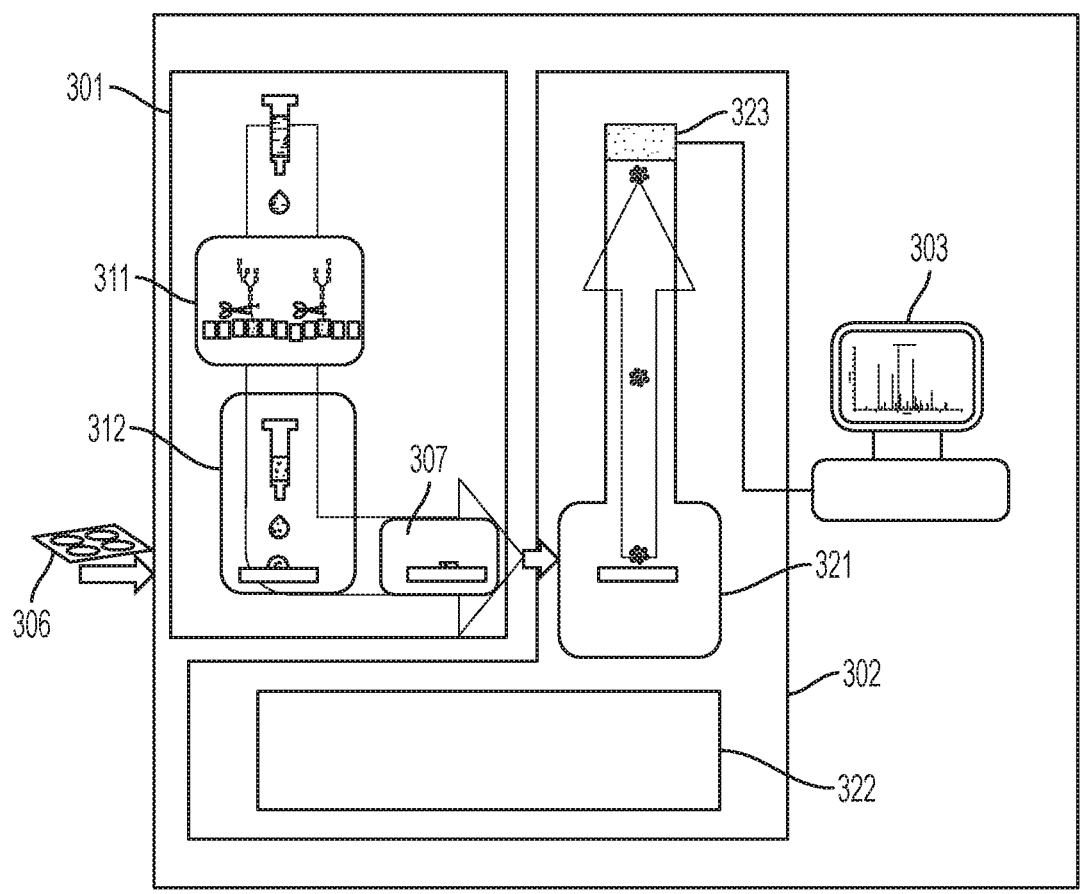

Example FIG. 3 is a system diagram of the integrated system including a sample processing unit, a MALDI-TOF MS unit, and a diagnosis unit in one system, in accordance with embodiments.

Figure 4:
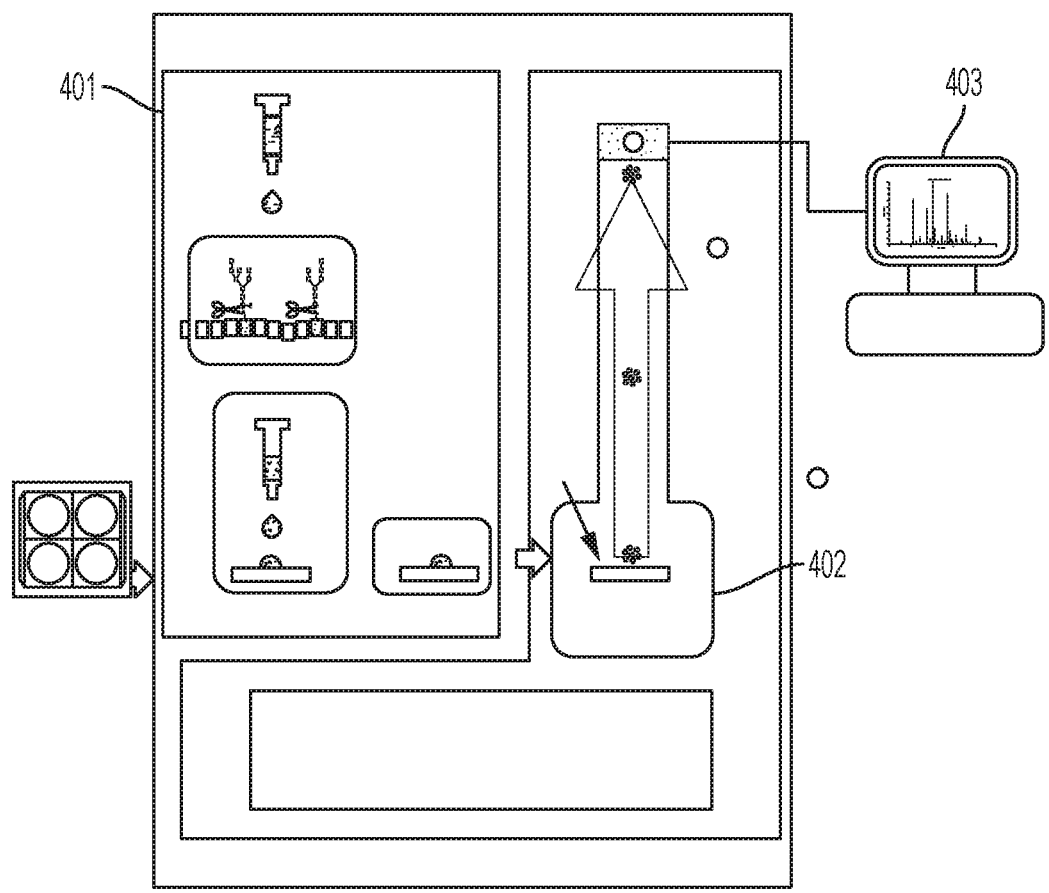

Example FIG. 4 is a system diagram of an integrated diagnostic system including a sample processing unit and a MALDI-TOF MS unit integrated in one system, whereas a diagnosis unit is provided as a separate unit, in accordance with embodiments.

Figure 5:
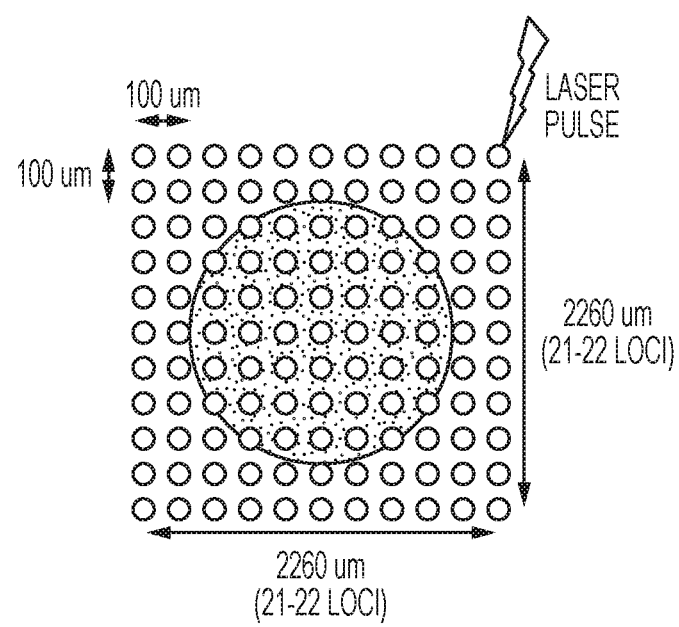

Example FIG. 5 illustrates a MALDI Plate where a spot on a sample plate is irradiated by a laser pulse, in accordance with embodiments.

Figure 6:
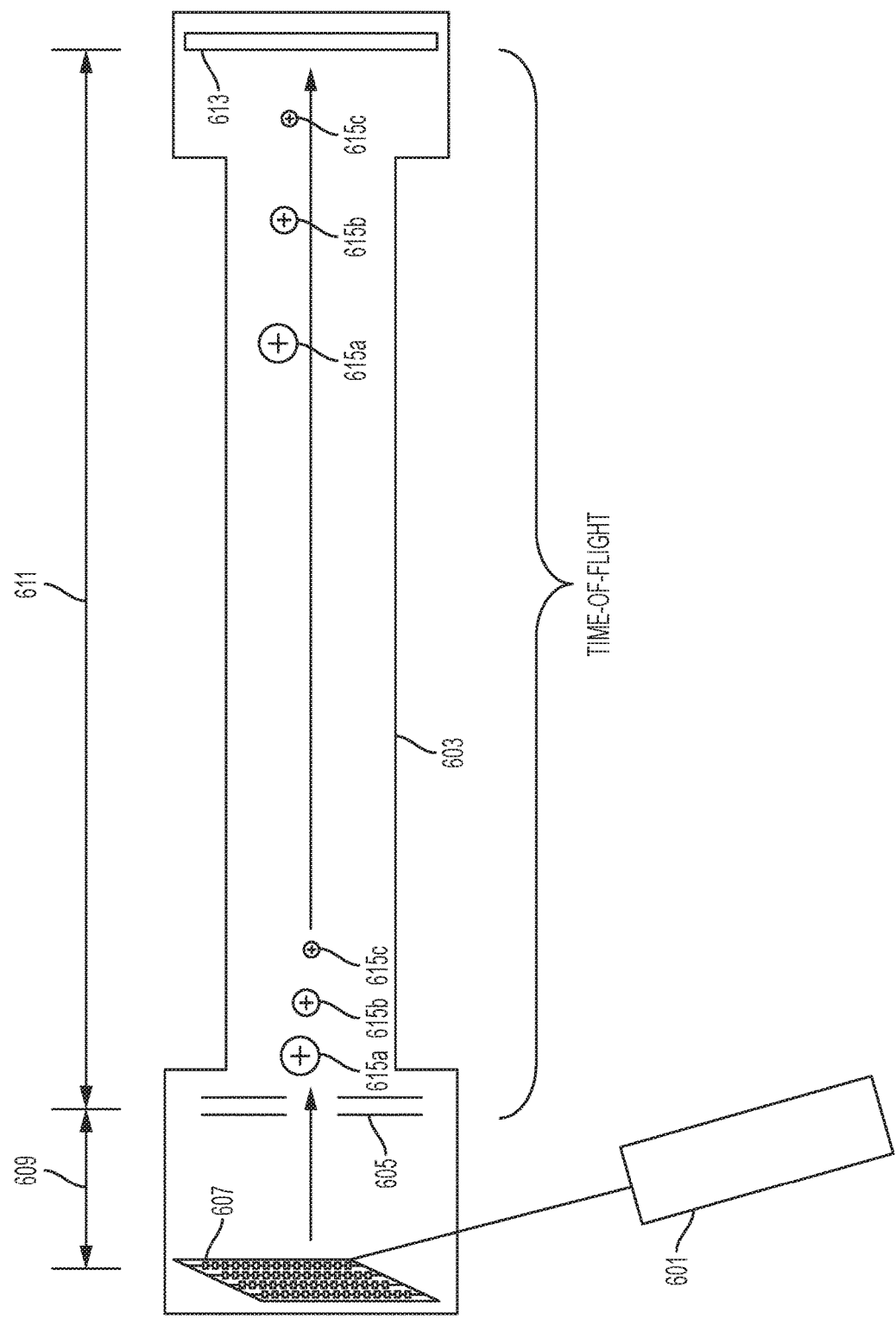

Example FIG. 6 is a MALDI-TOF MS hardware diagram, in accordance with embodiments.

Figure 7:
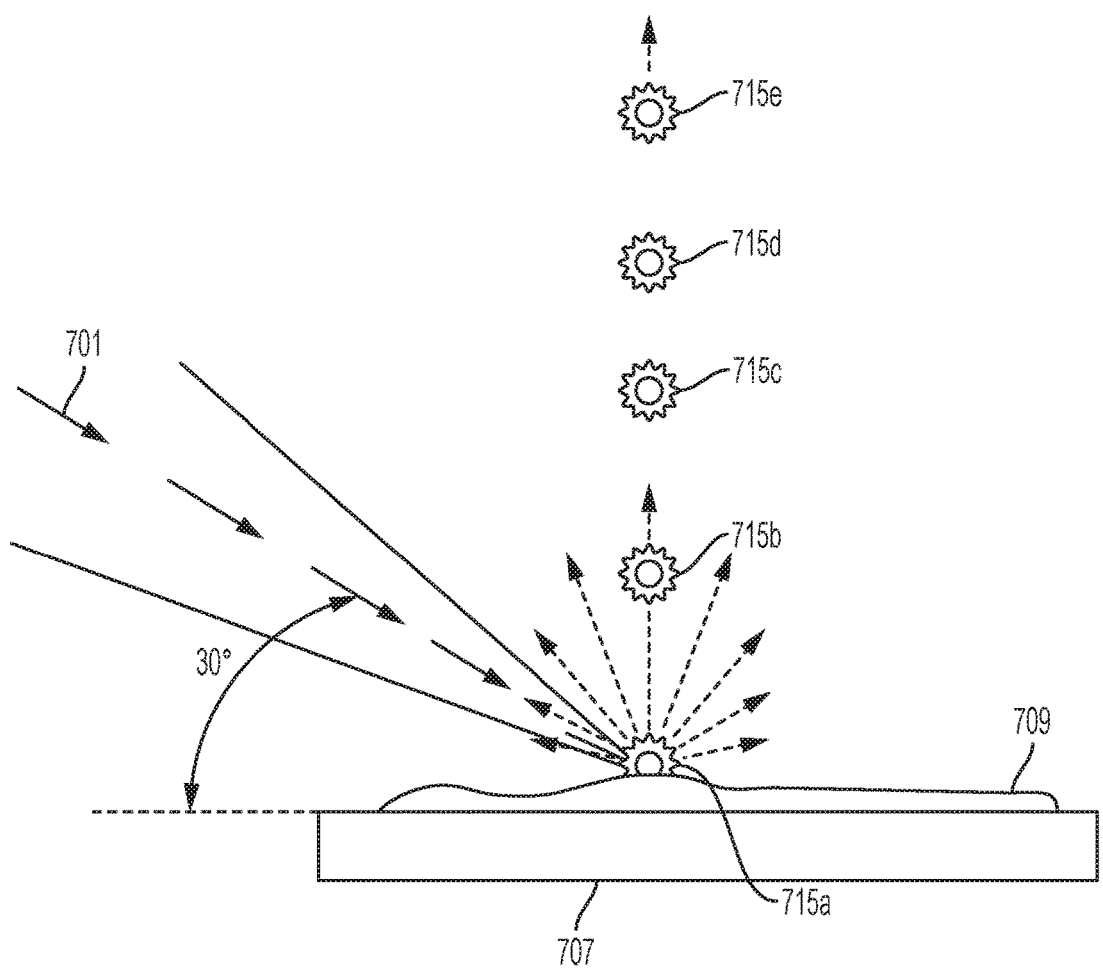

Example FIG. 7 illustrates a laser pulse applied to sample in MALDI chamber, in accordance with embodiments.

Figure 8:
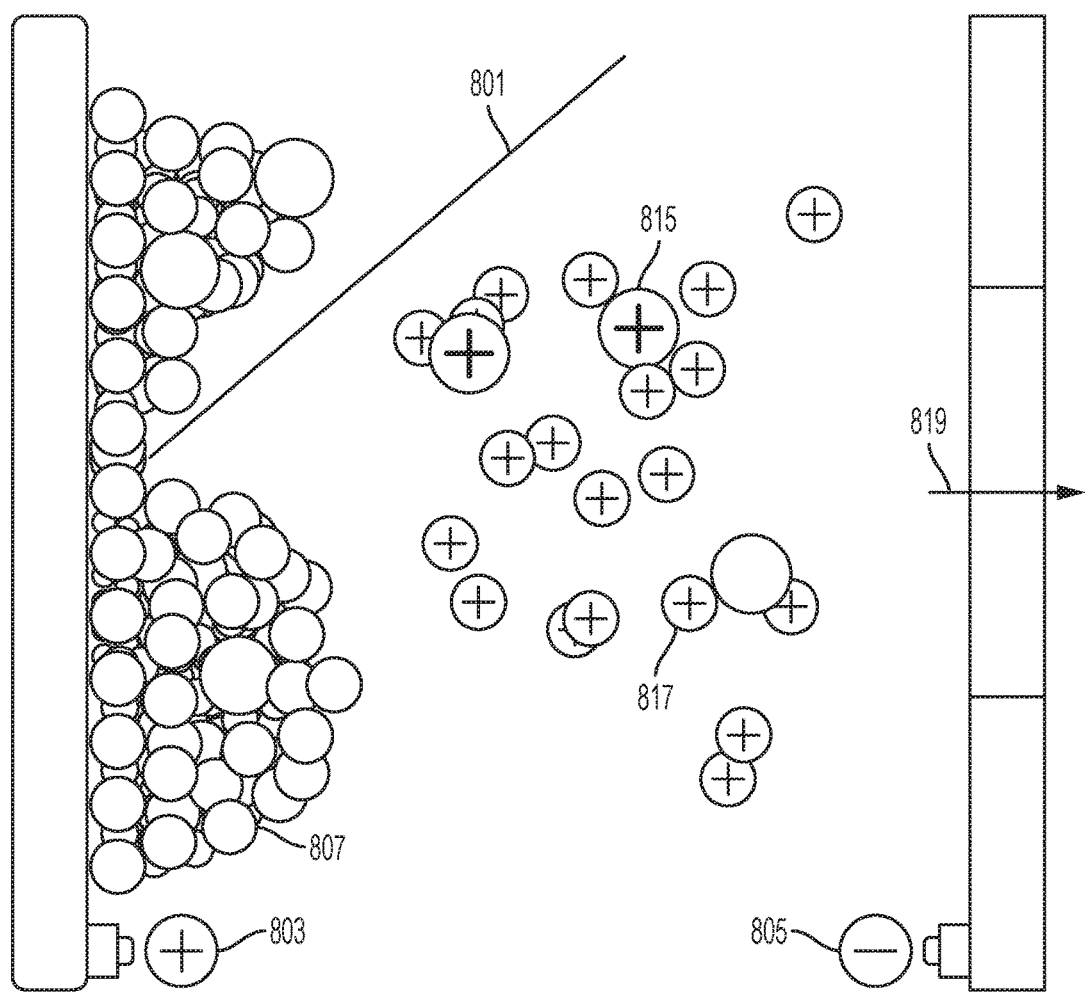

Example FIG. 8 illustrates an ionization of sample particles as a result of laser exposure, in accordance with embodiments.

Example FIGS. 9, 10A-B, and 11A-B illustrate hypothetical matching analysis, in accordance with embodiments.

DESCRIPTION

A biomarker is a biological molecule found in blood, other body fluids, or tissues that is a sign of a normal or abnormal process, or of a condition or disease. For example, a glycoprotein CA-125 is a biomarker that signals the existence of a cancer. Hence, biomarkers are often measured and evaluated to identify the presence or progress of a particular disease or to see how well the body responds to a treatment for a disease or condition. Existence or a change in quantity level of biomarkers in proteins, peptides, lipids, glycan or metabolites can be measured by mass spectrometers.

Among numerous types of mass spectrometers, Matrix-Assisted Laser Desorption/Ionization Time-of-Flight Mass Spectrometry (MALDI-TOF MS) is an analytical tool employing a soft ionization technique (e.g. example FIGS. 1-8). MALDI-TOF MS may be used in a laboratory environment to rapidly and accurately analyze biomolecules and expanding its application to clinical areas such as microorganism detection and disease diagnosis such as cancers. For example, as illustrated in FIG. 6, samples may be embedded in a matrix 607 and a laser 601 may fire laser pulses at the sample. The matrix 607 may absorb the energy from the laser 601 and the molecules of the sample may be ionized 615a-c. The ionized molecules 615a-c may then accelerated into flight tube 603 by an electrical field generated by electrodes 605 in proximity to the matrix 607. The ionized particles 615a-c may fly through the flight tube 603 and may be detected as a distribution of the time-of-flight measurements of the ionized particles 615a-c that are detected by detector 613. In embodiments, time-of-flight measurements (e.g. distribution profile 1109 and 1111 illustrated in FIGS. 11B) are not converted to mass-to-charge-ratio-versus-intensity (m/z) prior to being matched with a reference library (e.g. by diagnosis units 303 and 403 in FIGS. 3 and 4).

A factor affecting data reproducibility may be the measurement sensitivity or measuring process of a MALDI-TOF MS system. While MALDI-TOF MS may be able to analyze samples fast with high sensitivity, there may be quantitative analysis complications because Relative Standard Deviation (RSD) of detected distribution profiles may be relatively high due to imperfections in the ionization process. In embodiments, the spectrometer data may be calibrated, standardized, normalized, and/or otherwise manipulated in manners that make the data more reproducible.

Example FIG. 1 illustrates a disease diagnosis laboratory where a sample processing facility 101 includes multiple sample processing tools, a MALDI-TOF MS system 102, and a diagnosis software system 103, which are separated from each other, in accordance with embodiments. To extract a glycan for an ovarian cancer diagnosis, for example, a patient's serum is entered into a multi-well plate 111 to undergo a sample reception process and a protein denaturation process 112, followed by a deglycosylation process using enzyme 113. A protein removal process 114, a drying and centrifugation process, a glycan extraction process 115, and a spotting process 116 then follow. The spotted samples are analyzed by the MALDI-TOF MS system 102 to generate at least one glycan profile. The diagnosis software 103 compares the glycan profile of the sample with the pre-stored glycan profile or profiles to identify the presence and progress of ovarian cancer. Example FIG. 2 is a schematic view of a MALDI-TOF MS system, in accordance with embodiments.

Example FIG. 3 is a system diagram of the integrated system including a sample processing unit, a MALDI-TOF MS unit, and a diagnosis unit in one system, in accordance with embodiments. Samples may undergo a combination of process by selected modules. In the sample preparation system 301, a sample goes through a predefined and pre-programmed sequence depending on diagnosis or screening purposes in an automatic sample preparation unit 311. In embodiments, for glycan extraction, multiple processing modules may be selected, which as sample reception, protein denaturation, deglycosylation, protein removal, drying, centrifugation, solid phase extraction, and/or spotting. After sample preparation, the sample loader 312 loads the samples onto the plates 306 and are dried in a sample dryer 307.

The samples may then be provided to the MALDI-TOF MS unit 302 having an ion flight chamber 321 and/or a high voltage vacuum generator 322, in accordance with embodiments. A processing unit 323 in the MALDI-TOF MS may identify the time-of-flight of ionized particles (e.g. ionized particles 615*a*-*c* of FIG. 6) and the corresponding intensity distribution detected by a detector. For the disease diagnostic purpose, in accordance with embodiments, those acquired time-of-flight and intensity data may be reorganized to set up a standard time-of-flight list, in which a center of time-of-flight distribution being where intensities are balanced and equilibrated is introduced. A standard time-of-flight list may be based upon the machine accuracy and other relevant considerations. The stored spectrum data for each laser irradiation may also be used to set up the standard time-of-flight list. The diagnostic unit 303 may then compare, the spectra from a patient's sample with the pre-stored spectra and analyzes the pattern difference of the two spectra. The diagnostic unit may then identify the presence and progress of the disease.

Example FIG. 4 is a system diagram of an integrated diagnostic system including a sample processing unit and a MALDI-TOF MS unit integrated in one system, whereas a diagnosis unit 403 is provided as a separate unit, in accordance with embodiments. Example FIG. 4 illustrates an integrated disease diagnosis system where the sample preparation unit 401 and the MALDI-TOF 402 are integrated, with the diagnosis unit 403 stands apart as a separate unit, in accordance with embodiments.

In embodiments, a diagnosis unit may utilize a reference library. A reference library may be co-located with a diagnosis unit or separated from a diagnosis unit. A diagnosis unit may be co-located with a spectrometer or separated from a spectrometer. In embodiments, the reference library may be stored in a storage device, a Matrix-Assisted Laser Desorption/Ionization Time-of-Flight Mass Spectrometer (MALDI-TOF MS), a data storage device in a spectrometer, a data storage device separate from a spectrometer, a data storage device in communication with a spectrometer through a network, a cloud storage system, and/or a data storage device in communication with a spectrometer through an internet connection.

Embodiments relate to an apparatus, method, or computer program. In embodiments, spectrometer test data of a sample may be received for processing (e.g. at diagnosis unit 103, 303, and/or 403). The spectrometer test data may include time-of-flight data in units of time and intensity of ionized particles travelling through a flight tube. The spectrometer test data may be matched to a reference library to determine characteristic information of the sample. The reference library may include spectrometer sample data in units of time and intensity of ionized particles of pre-stored reference samples detected by spectrometers in the past. The spectrometer reference data has known characteristics that the matching operation associates with the received spectrometer test data.

In embodiments, spectrometer test data is mass spectrometer test data and/or the spectrometer is a mass spectrometer. In embodiments, the spectrometer is a Matrix-Assisted Laser Desorption/Ionization Time-of-Flight Mass Spectrometer (MALDI-TOF MS).

In embodiments, the sample comprises molecules and/or the characteristic information of the sample includes biological analysis information of the sample. The biological analysis information may be a medical diagnosis of a human being, an animal, a plant, and/or a living organism.

Example FIG. 5 illustrates a MALDI plate where a spot on a sample plate is irradiated by a laser pulse, in accordance with embodiments.

Example FIGS. 6-7 illustrate spectrometer hardware, in accordance with embodiments. A laser 601 (e.g. FIG. 6) may fire laser pulses 701 at target 707 (e.g. FIG. 7). Target 707 may include a sample material 709 (e.g. human blood and/or other substances). Sample material 709 may absorb energy from laser pulses 701 and produce ionized particles 715*a*-*e* with characteristics and/or attributes representative of sample material 709. In embodiments, laser 701 may be projected onto sample 709 at approximately a 30 degree angle, although all other angles may be used.

As illustrated in FIG. 6, electrodes 605 may generate an electric field in relative proximity 609 to target 607. Any ionized particles 615*a*-*c* generated at target 607 in response to laser 601 may be magnetically drawn into flight tube 603. In effect, ionized particles 615*a*-*c* are accelerated into flight tube 603 and projected along the length 611 of flight tube 603 and received at detector 613. Ionized particle 615a may have a greater mass than ionized particles 615b-c. Accordingly, smaller ionized particles 615b-c may travel faster in flight tube 603 than larger ionized particle 615a. As measured at detector 613, a time-of-flight of each of the ionized particle 615a-c is measured at detector 613 in relation to the timing of one or more laser pulses from laser 601. Different types of detectors aside from detector 613 are appreciated by those of ordinary skill in the art.

Since each laser pulse from laser 601 may generate a relatively large number of ionized particles, detector 613 may effectively measure a statistical distribution of the time-of-flight measurements of all of the ionized particles that are generated from one or more synchronously times laser pulses (e.g. FIGS. 9, 10A-B, and 11A-B). Ionized particles 615a-c may have the same or substantially the same kinetic energy as they are being accelerated by electrodes 605 and prior to entering flight tube 603. After passing out of range of electrodes 605, ionized particles 615a-c may enter flight tube 603 which is substantially field-free. Flight tube 603 may have a predetermined length 611. Ionized particles 615a-c may have different speeds depending on their mass once ionized particles 615a-c enter the field free flight tube 603. Larger ionized particle 615a may take more time to traverse flight tube 603 than smaller ionized particles 615b-c.

Example FIG. 8 illustrates ionization of sample 807 as a result of laser beam 801, in accordance with embodiments. Sample 807 may be irradiated by laser beam 801. Sample 807 may be vaporized into ionized particles (e.g. ionized particles 815 or 817). As the sample 807 absorbs the laser 801 and portions of sample 807 become ionized, some of that energy is passed to the ionized particles 815 or 817. Voltage is applied to electrodes 803 and 805, drawing 819 the ionized molecules 815 or 817 into a flight tube (e.g. flight tube 603 of FIG. 6).

In embodiments, a matching process includes analysis of time-of-flight data without converting the time-of-flight data into a mass-to-charge-ratio-versus-intensity profile. In embodiments, a matching operation may process time-of-flight data to minimize the spread of peaks which may otherwise be unnecessarily spread by a quadratic operation when converting time-of-flight data into a mass-to-charge-ratio-versus-intensity profile. In embodiments, minimization of spread of peaks may minimize a relative standard deviation of time-of-flight data. A minimized relative standard deviation may maximize at least one of reproducibility or accuracy of a spectrometer, in accordance with embodiments. In embodiments, a matching process uses time-of-flight data to minimize undesirable overlap between adjacent peaks. In embodiments, a matching process uses time-of-flight data to optimize binning and/or calibration accuracy of a spectrometer. In embodiments, matching may determine characteristic information of a sample.

In embodiments, matching may be determined from artificial intelligence and/or a deep learning algorithm. In embodiments, matching may optimize at least one of diagnosing, screening, or identifying a medical condition. In embodiments, matching may include deciding to match spectrometer test data with spectrometer reference data if there is substantially similar time-of-flight profiles. In embodiments, deciding to match the substantially similar time-to-charge profiles may be performed according to predetermined thresholds. In embodiments, deciding to match substantially similar time-of-flight profiles may be performed according to dynamic thresholds. The dynamic thresholds may be determined by artificial intelligence and/or deep learning algorithms, in accordance with embodiments.

In embodiments, ionized particles may be generated by a laser configured to irradiate a target area to ionize a sample placed in the target area. A first end of a flight tube may be proximate to at least one electrode configured to accelerate the ionized particles into the flight tube. A second opposite end of the flight tube may be proximate to a detector which measures a time-of-flight of the ionized particles through the flight tube and an intensity of the ionized particles.

In embodiments, time-of-flight data in units of time and intensity optimizes isolation of variations in attributes of the ionized particles. Attributes of each of the ionized particles may include an acceleration efficiency of each of the ionized particles through at least one electrode, in accordance with embodiments. The attributes of each of the ionized particles may include delays in at least one of the ionized particles entering the flight tube, in accordance with embodiments. The attributes of each of the ionized particles may include variations of path of flight of at least one of the ionized particles inside the flight tube, in accordance with embodiments.

In embodiments, time-of-flight data in units of time and intensity may minimize spread of distribution data to maximize accommodation of physical variations in the sample. In embodiments, time-of-flight data in units of time and intensity may optimize data reproducibility. In embodiments, the time-of-flight data in units of time and intensity may maximize diagnostic accuracy.

Embodiments relate to optimal aligning time-of-flight test data with pre-determined mass ranges and/or bins (e.g. associated with known characteristics) by not converting a time-of-flight measurements into a mass-to-charge-ratio-versus intensity profile (m/z) prior to matching analysis. Accordingly, in embodiments, by using a time-of-flight-versus-intensity profile as opposed to a converted mass-to-charge-ratio-versus-intensity profile, test data may be optimally aligned with accurate matches in a reference library. In embodiment, consequentially, a spectrometer may be able to more accurately diagnose diseases from a blood sample (or other applications). Time-of-flight data and its corresponding spreads may increase linearly as opposed to quadratically and thus may yield more symmetric time ranges about any specific mass, in accordance with embodiments. Because these ranges may be more symmetric or may at least increase at less than exponential rates, a fixed time bin may more accurately calibrate time-of-flight values of both high and low times than a fixed mass bin calibrating mass values of both high and low masses, in accordance with embodiments. In embodiments, a time-of-flight-versus-intensity profile may have a more desirable relative standard deviation (RSD) than a mass-to-charge-ratio-versus-intensity profile.

Example FIGS. 9, 10A-B, and 11A-B illustrate hypothetical matching analysis, in accordance with embodiments.

Figure 9:
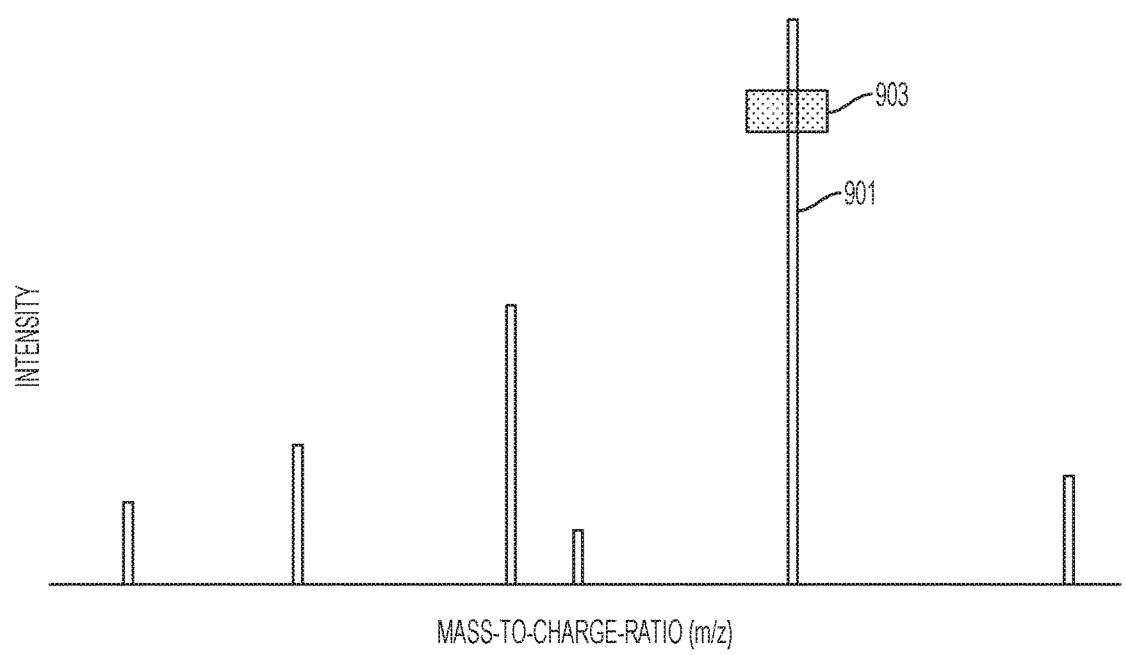

For example, mass bins may be more effective when the peaks they represent are isolated and/or distinct such as illustrated in FIG. 9 of Matching Analysis #1, in accordance with embodiments. In this example, a test sample profile peak 901 matches with mass bin 903 of a library sample.

Figure 10A:
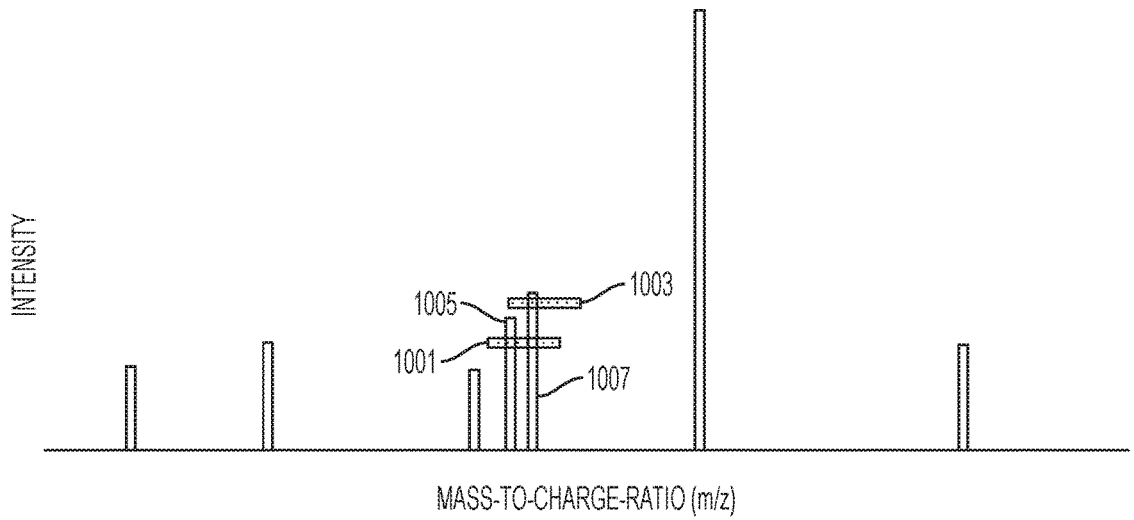
Figure 10B:
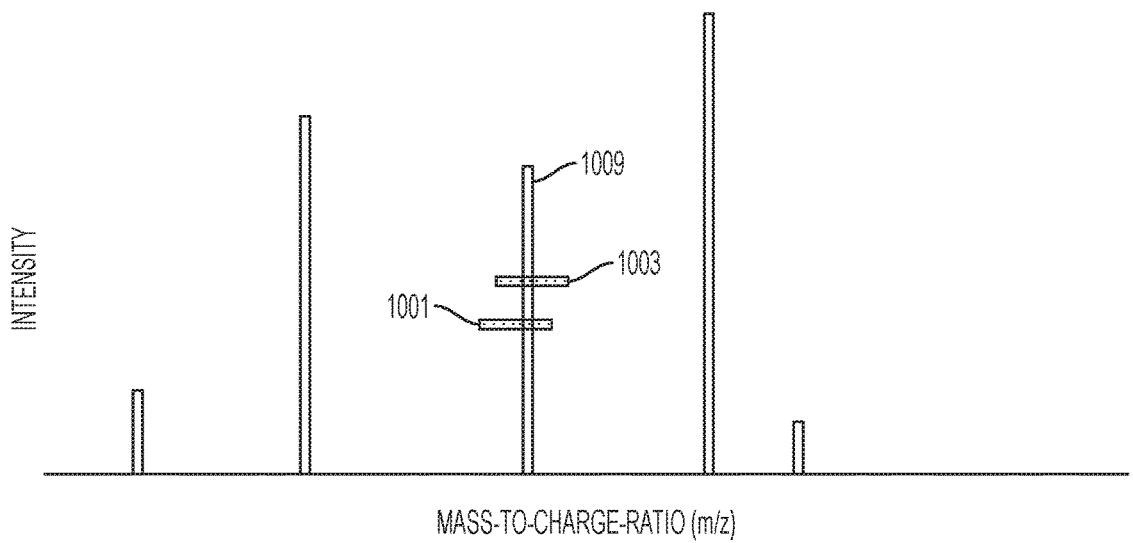

However, issues may arise when mass peaks are closer together and/or their corresponding bins overlap. This issue is illustrated in FIGS. 10A and 10B of Matching Analysis #2 and Matching Analysis #3. Matching Analysis #2 in FIG. 10A shows the mass bins 1001 and 1003 overlapping between two close peaks 1005 and 1007. In this example, peak 1005 may be accurately associated with bins 1001, since the mass-versus-intensity peak 1005 intersects with bin 1001. However, in this example, peak 1007 may be matched to both bins 1001 and 1003, thus possibly resulting in an inaccurate diagnosis analysis. Likewise, Test Sample #3 in FIG. 10B may result in an inaccurate diagnosis analysis, since peak 1009 intersects both bins 1001 and 1003.

In embodiments, it may be challenging to effectively distinguish which mass-to-charge (m/z) peak to calibrate to without using further data-truncating estimation techniques if time-of-flight test data is converted to mass-to-charge-ratio data, which may in turn may have the effect of reducing diagnostic accuracy.

Figure 11A:
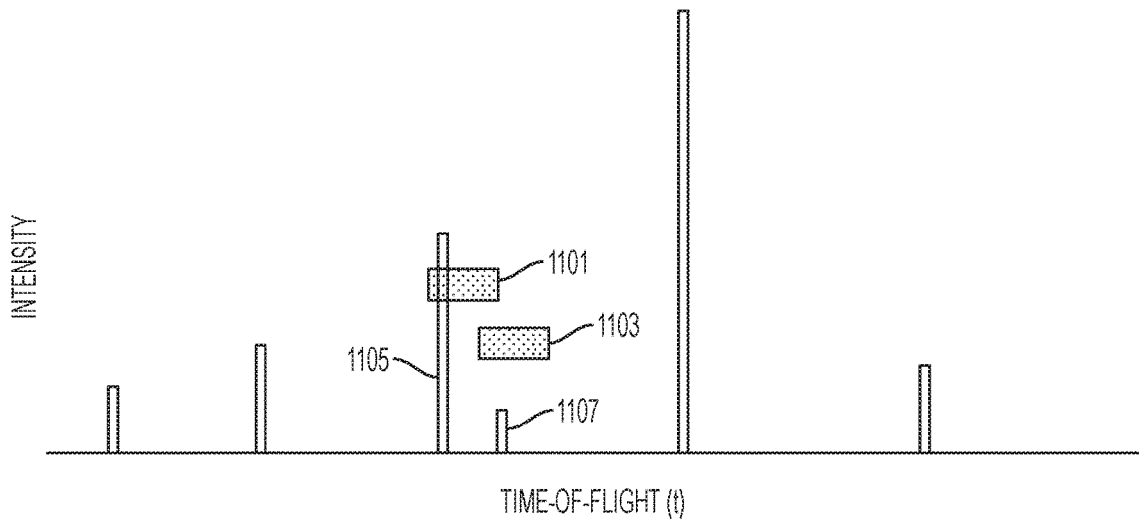
Figure 11B:
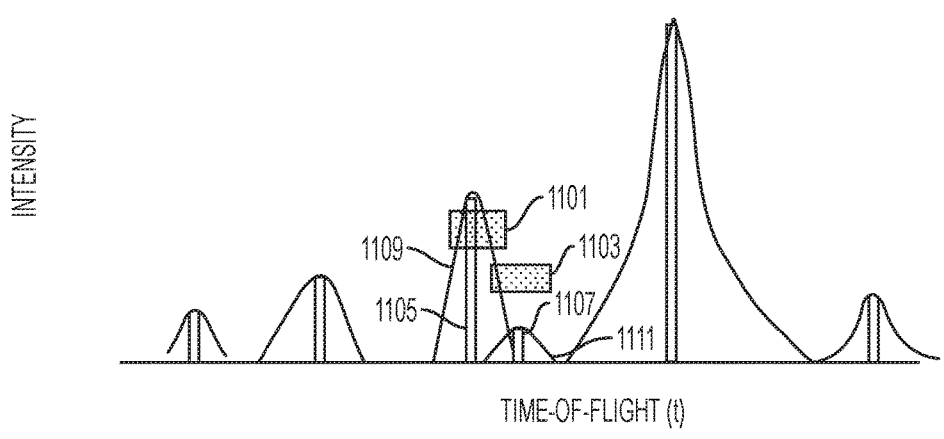

Example FIGS. 11A-B illustrate time-of-flight test data (e.g. peaks 1105 and 1107) associated with reference bins (e.g. bins 1101 and 1103) in example Matching Analysis #4, in accordance with embodiments. Different than Matching Analysis #1, #2, and #3 whose profile is expressed as mass-to-charge-ratio-versus-intensity, Matching Analysis #4 is expressed as a profile of time-of-flight-versus-intensity. According to embodiments, since Matching Analysis #4 is a profile of time-of-flight-versus-intensity, actual distributions 1109 and 111 which are used to determine peaks 1105 and 1107 respectively have a minimized relative standard deviation since the time-of-flight data is not subjected to a quadratic function, which would have unnecessarily spread distributions 1109 and 1111. In embodiments, since distributions 1109 and 1111 are not unnecessarily spread, the associated peaks 1105 and 1107 may be unambiguously matched to bin 1101 and not bin 1103, respectively.

Embodiments relate to the use of time versus intensity analysis instead of mass versus intensity analysis. Embodiments may utilize even spacing character of time. In embodiments, a dimensional effect (e.g. chamber diameter and length) and/or an optimization techniques may use deep learning techniques with inter-group and intra-group (e.g. cluster, classification, and categorization) cross validation constraints.

Embodiments may relate to data manipulation to compensate for a bottleneck effect and a nonlinear or uneven path of travel in a MALDI-TOF. In embodiments, data may be gathered and processed in a way that makes the data reproducible enough in that it can be used for accurate diagnostics.

In a MALDI-TOF system, ions entering the time of flight (TOF) chamber may not enter the chamber evenly. Ions entering a TOF chamber may not travel the same distance to the detector due to ions that may enter the TOF chamber at angles or otherwise bounce along the walls of the chamber before reaching the detector. A combination of these factors may lead to inconsistent mass profiles. To compensate for these limitations, embodiments may consider the length of the TOF chamber as a minimum travelling distance of any particle in the chamber measured at the detector. An effective length of the chamber (e.g. expected average travelling distance of particles) may be estimated based upon the assumptions of particles undergoing no bounce, one bounce, double bounces and/or more on an elastic flat surface of the inner chamber.

The maximum effective length may be used as the time range or mass range which may be regarded as the same mass. If we assume most of the particles experience no bounce in the chamber, then the maximum possible travelling length of any ion particle may be $L*[1+(D/L)^2]^{(1/2)}$, while experiencing only one bounce in the chamber and the number of ion particle with more than one bounce are small enough to be negligible, the maximum possible travelling length of particles may be $L*[1+4*(D/L)^2]^{(1/2)}$. If (for example) the diameter of the chamber is just less than 2.5% of the chamber length, the time-spread $\Delta t$ in which any intensity signals measured within this time range are regarded as the ones of ion particles of the same mass may be 1.00031 for no bounce and 1.00125 for one bounce.

Embodiments may consider ions moving together as packets so that the center of mass (e.g. representative mass) may be computed as $(m/z)_c = \Sigma(m/z)_j * I_j$, where representative mass $(m/z)_c$ is a weighted average of masses with each mass $(m/z)_j$ having its own intensity $I_j$. A tolerable mass range $\Delta m$ of a mass, in which all the masses are regarded as a same mass, may be $2*t*\Delta t$ where $(\Delta t)^2$ is small enough to be negligible. This may be equivalent to saying $\Delta m/m = 2*\Delta t/t$. Since $(1/2)*m*v^2 = z*U$ and $v = L/t$ in the field-free chamber, $L/t[=SQRT(2*U/(m/z))]$ may be assumed to be equal to each other for the same m/z. For any mass range where all the particles are assume to be from the same mass particles, the representative mass $m_c[(m/z)_c = \Sigma(m/z)_j * I_j / \Sigma I_j]$ may be a weighted average mass of a set of particles bounded by the dimensional equivalence range satisfying $L/t = L_e/(t+\Delta t)$, where $L_e$ is the effective chamber length and equal to the real travelling distance of particles in the drift chamber.

The chamber length L is the shortest travelling distance of any particle in the chamber, and the effective tube length $L_e$ is $L*SQRT(1+\beta(D/L)^2)$ where D is the inner diameter of the chamber and $\beta$ is the dimensional constant of 0 for the particles travelling the shortest length L, 1/4 for no-bounce and center-through particles (e.g. particles entering through the slit in the center of the tube entrance and reaching the edge of the detection plane of the chamber circle), 1 for no-bounce and edge-through particles (e.g. particles entering the slit in the edge of the tube), 4 for one-bounce, and so on. It may be desirable to design the chamber such that particles are drifting without bouncing on a wall of the chamber, the dimension constant $\beta$ may be assumed to be in between 1/4 and 1. Since $L_e/L = (t+\Delta t)/t = SQRT(1+\beta(D/L)^2)$, $t+\Delta t = t*SQRT(1+\beta(D/L)^2)$. Coupling with $t = L/SQRT(2*U/(m/z))$ may yield $t+\Delta t = L*SQRT[(1+\beta(D/L)^2)(m/z)/(2*U)]$.

Embodiments relate to data manipulation to compensate for inherent inconsistencies in mass determination and calibration. There may be complexities in calibrating mass data. Because mass/charge is dependent on a quadratic function of time $(m/z = k*t^2)$, the relative mass spread $\Delta(m/z)/(m/z)$ may be twice larger than the relative time spread $(\Delta t/t)$ and the mass spread $\Delta(m/z)$ increases as mass per charge (m/z) gets larger for a given time interval or range $\Delta t$ $[(m/z) = k*t^2$ where $k = 2*U/(L^2)$, $\Delta(m/z) = 2*k*t*\Delta t = 2*SQRT[k*(m/z)]*\Delta t$. $\Delta(m/z)/(m/z) = 2*k*t*\Delta t/(k*t^2) = 2*\Delta t/t]$.

To account for this uneven spacing and asymmetric nature of mass data, embodiments may use time-of-flight-versus-intensity data rather than mass-charge-ratio-versus-intensity data to perform applications. In some circumstances, mass binning techniques or mass calibrations may lead to insufficient and/or inaccurate outcomes because they are arbitrary chosen and the bins sometimes overlap between adjacent peaks. Embodiments may use an algorithm based on deep learning process to determine optimum number of mass or time bins to use for the determination and calibration of masses.

In embodiments, data may be gathered and/or processed in a way that makes the data reproducible enough in that it can be used for accurate diagnostics. For example, mass spectrums may be presented as a graph with an x-axis denoting mass to charge ratio of a sample and a y-axis intensity or relative intensity proportion to the number of particles at a given time or time bin (converted to a mass) reached a sensor. Given that most of the ions passing through the mass spectrometer have a charge of +1, the mass-to-charge ratio (m/z) may be deemed to represent the mass of an ion that is passing through the time-of-flight (TOF) chamber. When an ionized molecule passes all the way through the chamber and hits the sensor the machine may then calculate how long it took for the molecule to reach the sensor. This time information may be used to calculate the mass of the ion detected by the sensor. This mass may be determined from the law of conservation of energy where potential energy is equal to kinetic energy.

For example, the following are equations for potential and kinetic energy:

$$E_p = zU$$

$$E_k = \frac{1}{2}mv^2$$

By combining these equations, we may obtain the following relationship:

$$\frac{m}{z} = \frac{2U}{L^2} * t^2$$

In embodiments, m/z vs intensity data obtained from a MALDI-TOF MS may be intrinsically inconsistent. This may be due to the fact that after ionization by a laser or other source, particles entering the time-of-flight ("TOF" in MALDI-TOF MS) may not practically have a uniform initial velocity upon entry. In addition, they may not enter the TOF chamber simultaneously. The entrance of the TOF chamber may consist of slits through which the particles enter. Because there are so many particles entering a series of narrow slits, the particles may not be aligned uniformly along the axis of the slits.

In embodiments, instead of equal starting positions like a straight-line foot race, there may be a bottleneck effect where the particles are amassed around the slits (e.g. similar to a how a large number of runners start unevenly along a narrow road for a marathon race). This discrepancy in entry velocity as well as entry positioning affects MALDI-TOF results, because as mentioned earlier, the m/z may be determined by the following equation:

$$\frac{m}{z} = \frac{2U}{L^2} * t^2$$

L indicates the length of the TOF tube and t indicates the time it takes for a particle to reach the detector. Inconsistent particle velocity and/or inconsistent particle starting position (from the bottleneck effect) may affect t. The angles of particles at the entrance shall affect the travelling length in the chamber. Ionized particles (even of the same sample) may not reach the detector at uniform times, as they would in theory. In embodiments, MALDI-TOF MS data may be presented not as distinct or isolated peaks, but rather a spread of peaks across a range of m/z values along the x-axis. The aforementioned bottleneck effect may be one of the core reasons for why m/z vs. intensity and time vs. intensity yields spreads of masses or times as opposed to distinct peaks that can be obtained in a consistently reproducible manner. Embodiments may account for this inherent data discrepancy by considering the ions travelling through the TOF chamber as moving as a packet of ions rather than individually.

In embodiments, an underlying assumption behind this concept may be that each ion packet maintains an equilibrium status represented by:

1) For a mass m, $(m/z)_c = \Sigma(m/z)_j * I_j / \Sigma I_j$, where representative mass $(m/z)_c$ is a weighted average of masses with each mass, $(m/z)_j$ having its own intensity $I_j$.

2) For general cases, $\Sigma[m(i,j)*I(j)] = m(i,c)*\Sigma I(j)$, where m(i,c) represents the center of mass of the ion packet i, m(i,j) represents the jth mass particle around mass i, and I(j) represents the intensity of the jth particle around mass i.

In embodiments, m(i,c) may be solved by yielding:

$$m(i,c) = \Sigma[m(i,j)*I(j)] / \Sigma I(j)$$

With this center of mass information, embodiments may obtain the standard form of the mass distribution for each mass. This data may be acquired from MALDI-TOF MS operations in which a laser irradiates the sample shot-to-shot, spot-to-spot and/or sample-to-sample. By combining the standard mass distributions for each mass across the various operation types, the standard mass distribution profile may be built into a discrete or a continuous distribution profile. This standard (discrete or continuous) mass profile may yield higher accuracy for diagnosis, because it accounts or adjusts for many of the inherent inaccuracies of MALDI-TOF MS without truncating data, in accordance with embodiments.

A length of a TOF chamber alone may not adequately represent L in the aforementioned equation:

$$m/z = 2*U/(L^2)*t^2$$

This equation may rely on the assumption that the length of the TOF chamber accurately reflects the distance that particles travel through the TOF chamber to the detector. In other words, under this assumption the particles entering the time-of-flight tube travel straight towards the detector.

Due to non-uniform initial velocities of particles, a bottleneck effect, and the different incident angles of particles, the particles often do not travel through the TOF chamber linearly from entrance slit to detector. Rather, the particles may enter the slits at angles and often times even bounce off the TOF chamber walls before reaching the detector.

As a result, the length of the TOF chamber may not be a comprehensive measure of distance traveled by an ionized particle but rather the minimum distance it can travel. In embodiments, an equation to represent distance traveled is:

$$L*\sqrt{1+\beta*(D/L)^2}$$

Where β is a constant representing the bounces each particle takes on its way to the detector (β=0, for the travelling distance being L, β=¼, 1, 4 etc.). This assumption/equation may increase data accuracy, because it may more accurately describes the potential path or paths that particles take in mass spectrometry than the assumptive L=length of the time-of-flight tube assumption. This equation represents only some embodiments illustrating a means to account for an ion or particle's non-linear path in the TOF chamber towards the detector, as other embodiments can be appreciated from this disclosure.

A modified (or an effective) ion-path equation may serve to account for ions' nonlinear paths of travel, the ion-packet assumption that accounts for the bottleneck effect, and/or the consideration of masses' intensity effects improve the data analysis by pinpointing the exact or representative mass more accurately, so that they improve data reproducibility and diagnostic accuracy, in accordance with embodiments. Embodiments relating to this ion-path equation and similar concepts may more accurately describe the actual paths that particles may take in the TOF chamber than a mere linear path assumption. Embodiments relating to this ion-packet assumption may account for the unequal starting position of ions as they enter the TOF chamber. Embodiments may include density (depth of the sample)/intensity effects of the masses yields distribution profiles that also increase data reproducibility and diagnostic accuracy. These data manipulation techniques may be applied to both the test samples and the samples in the database used for reference (comparison) in order to maximize data standardization and normality between the two, in accordance with embodiments. This maximized data normality may reduce external factors and improve data reproducibility and diagnostic accuracy, in accordance with embodiments.

In MALDI-TOF, any specific mass may not be repeated at the same m/z value. The measured mass values vary with measurements. To account for these varying m/z peaks, mass peaks appearing within a certain range (several bins around each mass or ppm range of each mass level) may be aggregated to be a representative mass (sometimes the center of a mass) and then calibrated or adjusted by using one or several calibration substances of known mass or masses. In embodiments, theoretically obtainable protein masses may be calculated for samples by using a database of DNA sequencing and may also be used for a standard calibration base in addition to standard reference calibration substances, for more accuracy.

For example, parts per million (ppm) range of each mass level means, for example, 1000 ppm of a mass of 10,000 Daltons indicates masses within the range between $10,000*(1-1000*10^{-6})$ Daltons and $10,000*(1+1000*10^{-6})$ Daltons shall be counted as a same mass.

However, the ppm mass calibration technique or other arbitrary spacing in mass may be inherently flawed and thus may yield inaccurate data reproducibility for several major reasons. For example, (1) higher masses may yield wider mass spreads, (2) bins of nearby peaks may overlap, and/or (3) bins used to calibrate m/z may be inherently arbitrary in nature.

Higher masses may yield wider mass spreads. This phenomenon may be exacerbated by the fact that the MALDI-TOF MS detector may not initially record data as a function of m/z. Instead, the MALDI-TOF MS detector records the time of flight of particles and then converts this time to m/z according to the equation:

$$\frac{m}{z} = k * t^2 \text{ where } k = \frac{2U}{L^2}$$

By this relationship, m/z is related to $t^2$, which is a quadratic relationship. For example, if a particle takes 1 second to travel through the TOF chamber, its corresponding m/z would be $$\frac{2U}{L^2}.$$

As a comparative example, if another particle takes 2 seconds to travel through the TOF chamber, its corresponding m/z would be $$\frac{8U}{L^2}.$$

Likewise, the m/z would be $$\frac{18U}{L^2}$$

for a TOF of 3 seconds. Because m/z increases quadratically (as a function of time) as opposed to linearly, the spread of masses may increase exponentially as well (rather than stay relatively consistent or increase linearly).

As a result, mass distributions around peaks may typically be asymmetric in that larger masses may generally have larger spreads than smaller ones, for the same time-spread. Therefore, a fixed ppm range may not have equal effectiveness in calibrating masses for particles of different masses.

Whether calibrating masses with the use of ppm bins or using time bins, whatever range or criteria used may be flawed in that it may be selected arbitrarily. There may be limited indication of whether 100 ppm or 86 ppm is a better bin range for calibration other than empirical information. Embodiments relate to the mitigation of the uncertainty inherent in arbitrary calibration by utilizing optimized spacing and/or spread computations where mass intervals are optimized using a maximum independency constraint. Embodiments may use a deep learning based algorithm (e.g. artificial intelligence) to utilize algorithms to determine the ideal mass or time bins for optimal data reproducibility and diagnostic accuracy. The optimal mass and/or time bins may vary from sample-to-sample, disease-to-disease, and other parameters as well, in accordance with embodiments. A system may be optimized to select the ideal calibration bin for each separate sample/case, and the system may be optimized to select a general ideal calibration bin as well among other iterations, in accordance with embodiments. The calibration bin that is selected may be normalized between the test sample and the database samples to which it is being compared, in accordance with embodiments.

Due to the bottleneck effect and other factors introducing data inconsistency, it may be natural to see a spread of mass around the center of mass of a component. In embodiments, when comparing a mass profile data of a sample with the ones of other samples for diagnostic analysis, the first thing to do may be to find standard masses of a test sample to the corresponding masses of other reference sample data. If the mass matching is inaccurate, then the analysis may not be accurate, in accordance with embodiments. In embodiments, we can match each mass of a test sample with a reference standardized reference mass, but it is normal to expect that exact matching of all the masses of a test sample to the corresponding masses of reference database with other samples may be impossible or impractical because the calibration or adjustment of a mass (or substance) in a data profile can make alterations of other mass values at the same time or some of the masses to use for matching shall not be available for the theoretical mass information. In embodiments, we may at this point develop standard mass list(s) for the sample as much as possible. In embodiments, center of mass, $m_c(i)$, for the ith mass, $m(i)$, may be used along with the theoretical mass for confirmation and further calibration.

Embodiments relate to considering the density (intensity) effects of the masses rather than ignoring them. Another source of the data matching problem may be the instrument itself. The data profile may be different whenever a laser is irradiated onto a sample due to the intrinsic character of MALDI-TOF MS. Each particle of the same mass (substance) may not reach the detector coincidentally due to the instrument geometry and non-uniform kinetic energy of particles moving into the field-free chamber, etc. MALDI-TOF MS may show the data in such a way that intensity values of each laser shot for each mass (masses about a representative mass are modified to the representative mass) are accumulated or averaged to the representative mass. In this process, the mass value seen may be the one ignoring the intensity effect (density effect) of the mass, where intensity is proportional to the number of particles of the substance or mass. At the same time, the mass and intensity distribution effects associated with the laser shots may be neglected, which may lead to incorrect information about the quantity or pattern of a mass or masses.

Even small alterations during calibration of a mass may adversely affect the accuracy of diagnostics. To resolve the problem, embodiments suggest the use of a continuous distribution concept created from original discrete values of mass and intensity. The intensities may be regarded as the number of occurrences. A probability density function for each mass may be created and the continuous mass distribution profile may be used for comparison with other sample data profile or data profiles. This is merely one of the possible iterations of the standard mass distribution. Each mass may have its own standard mass distribution, and mass distribution data profile for a sample may be stored as a part of library DB. In summary, mass density function (distribution) for each standard mass, the corresponding intensity density function (distribution) for each standard mass, and intensity versus standard mass distribution curves may be built as a library for each sample.

These continuous distribution profiles may be used for greater data reproducibility and more accurate diagnosis, in accordance with embodiments.

In embodiments, given that most charge of the ion passed through mass spectrometer is +1, mass-to-charge ratio may represent the mass of an ion that is passing a chamber. The mass may be measured when an ionized molecule is passed through the chamber and hits the sensor. The machine calculates how long it took for the molecule to reach the sensor.

In time-of-flight mass spectrometry, potential energy is equal to kinetic energy (by the law of conservation of energy).

Mass-to-charge ratio is correlated to square of time. Given that MALDI-TOF measures time traveled by ionized molecules, using mass-to-charge ratio may be misleading, in accordance with embodiments. For example, if m/z=1, m/z=4, then the amount of time traveled is equal to 1 and 2 seconds. And if m/z=81, m/z=85, the time traveled for those two units are 9 seconds and $\sqrt{85} \approx 9.22$. Each peak may therefore be asymmetric in mass-intensity profile. There may be more chance of seeing symmetrical character with time than with mass, in accordance with embodiments. Embodiments relate to the symmetric character of profiles possibly explaining the central tendency of the mass distribution, which in turn may make analysis simpler and/or faster.

Embodiments relate to the consideration that part of the signal noise in the profile may come from overlapping effects between adjacent mass particles. Overlapping may be inevitable because particles of the same mass cannot enter the no-field drift zone with the same kinetic energy (same velocity), and/or the fact that their trajectories may be different, in accordance with embodiments. In embodiments, even if the potential energy applied to the particles is the same (=z*U), the flight distance of the particles shall be in between L, length of the drift field-free chamber and $L*\sqrt{1+\beta*(D/L)2}$, where $\beta$ is a constant associated with the number of bounces of each particle and entering angles of particles {$\beta$=0 (minimum length of travel L, ¼ (center entering, edge reaching, no-bounce), 1 (edge entering, edge reaching, no-bounce), and 4 (maximum length with one bounce). In embodiments, if the chamber inner surface may be considered to be completely elastic and thus there may be considered to be a maximum of only one bounce (in other words a negligible number of particles experience more than one bounce onto the inner chamber, and the trajectory of particles in the detector may be negligible). Therefore the relative spread $\Delta t/t$ may be $\beta*(D/L)2$ which in turn could be the maximum mass interval of the TOF system, in accordance with embodiments.

It will be obvious and apparent to those skilled in the art that various modifications and variations can be made in the embodiments disclosed. This, it is intended that the disclosed embodiments cover the obvious and apparent modifications and variations, provided that they are within the scope of the appended claims and their equivalents.

What is claimed is:

1. A method comprising:
receiving spectrometer test data of a sample that comprises time-of-flight data in units of time-of-flight and intensity of ionized particles travelling through a flight tube;
matching the spectrometer test data to a reference library to determine characteristic information of the sample,
wherein the reference library comprises spectrometer sample data in units of time-of-flight and intensity of ionized particles of pre-stored reference samples detected by at least one spectrometer,
wherein the spectrometer reference data has known characteristics that the matching associates with the received spectrometer test data, and
wherein the matching processes the time-of-flight data without converting the time-of-flight data into units of mass-to-charge-ratio and intensity, thereby minimizing the spread of peaks associated with mathematical squaring in a quadratic operation when converting the time-of-flight data into units of mass-to-charge-ratio.

2. The method of claim 1, wherein the matching processes the time-of-flight data without converting the time-of-flight data into units of mass-to-charge-ratio.

3. The method of claim 1, wherein the minimization of the spread of peaks minimizes a relative standard deviation of the time-of-flight data in units of time-of-flight and intensity.

4. The method of claim 3, wherein the minimized relative standard deviation is to maximize at least one of reproducibility or accuracy of time-of-flight data in units of time-of-flight and intensity.

5. The method of claim 1, wherein the matching processes the time-of-flight data to minimize overlap between adjacent peaks associated with the time-of flight data in units of time time-of-flight and intensity.

6. The method of claim 5, wherein the matching processes the time-of-flight data to optimize at least one of binning or calibration accuracy.

7. A method of claim 1, wherein:
the spectrometer test data is mass spectrometer test data;
the at least one spectrometer is at least one mass spectrometer.

8. The method of claim 7, wherein the at least one spectrometer comprises a Matrix-Assisted Laser Desorption/Ionization Time-of-Flight Mass Spectrometer (MALDI-TOF MS).

9. The method of claim 1, wherein the matching determines characteristic information of the sample.

10. The method of claim 1, wherein:
the sample comprises molecules;
the characteristic information of the sample comprises a biological analysis information of the sample.

11. The method of claim 10, wherein the biological analysis information is a medical diagnosis of at least one of a human being, an animal, a plant, or a living organism.

12. The method of claim 1, wherein the matching is determined from at least one of artificial intelligence or a deep learning algorithm.

13. The method of claim 1, the matching optimizes at least one of diagnosing, screening, or identifying a medical condition.

14. The method of claim 1, wherein the matching comprises deciding to match the spectrometer test data with the spectrometer reference data if there is substantially similar time-of-flight-versus-intensity profiles.

15. The method of claim 14, wherein the deciding to match the substantially similar time-of-flight-versus-intensity profiles is performed according to predetermined thresholds.

16. The method of claim 14, wherein the deciding to match the substantially similar time-of-flight-versus-intensity profiles is performed according to dynamic thresholds.

17. The method of claim 16, wherein the dynamic thresholds are determined by at least one of artificial intelligence or deep learning algorithms.

18. The method of claim 1, wherein:
the ionized particles are generated by a laser configured to irradiate a target area to ionize the sample placed in the target area;
a first end of the flight tube is proximate to at least one electrode configured to accelerate the ionized particles into the flight tube; and
a second opposite end of the flight tube is proximate to a detector which measures a time-of-flight of the ionized particles through the flight tube and an intensity of the ionized particles.

19. The method of claim 1, wherein the time-of-flight data in units of time-of-flight and intensity optimizes isolation of variations in attributes of the ionized particles.

20. The method of claim 19, wherein the attributes of each of the ionized particles comprises an acceleration efficiency of each of the ionized particles through at least one electrode.

21. The method apparatus of claim 19, wherein the attributes of each of the ionized particles comprises delays in at least one of the ionized particles entering the flight tube.

22. The method of claim 19, wherein the attributes of each of the ionized particles comprises variations of path of flight of at least one of the ionized particles inside the flight tube.

23. The method of claim 1, wherein the time-of-flight data in units of time-of-flight and intensity compensates for physical variations in the sample.

24. The method of claim 1, wherein the time-of-flight data in units of time-of-flight and intensity optimizes data reproducibility.

25. The method of claim 1, wherein the time-of-flight data in units of time-of-flight and intensity maximizes diagnostic accuracy.

26. The method of claim 1, wherein the reference library is stored in at least one of a storage device, a Matrix-Assisted Laser Desorption/Ionization Time-of-Flight Mass Spectrometer (MALDI-TOF MS), a data storage device in an apparatus performing the method, a data storage device outside the apparatus performing the method, a data storage device in communication with the apparatus performing the method, through a network, a cloud storage system, or a data storage device in communication with the apparatus performing the method through an internet connection.

27. An apparatus comprising:
at least one processor;
a receiving unit configured to receive spectrometer test data of a sample that comprises time-of-flight data in units of time and intensity of ionized particles travelling through a flight tube using the at least one processor;
a matching unit configured to match the spectrometer test data to a reference library to determine characteristic information of the sample using the at least one processor,
wherein the reference library comprises spectrometer sample data in units of time and intensity of ionized particles of pre-stored reference samples detected by at least one spectrometer,
wherein the spectrometer reference data has known characteristics that the matching unit associates with the received spectrometer test data, and
wherein the matching unit processes the time-of-flight data without converting the time-of-flight data into units of mass-to-charge-ratio and intensity, thereby minimizing the spread of peaks associated with mathematical squaring in a quadratic operation when converting the time-of-flight data into units of mass-to-charge-ratio.

28. A computer program product, comprising a computer readable hardware storage device having computer readable program code stored therein, said program code containing instructions executable by one or more processors of a computer system to implement a method of assessing damage to an object, said method comprising:
receiving spectrometer test data of a sample that comprises time-of-flight data in units of time and intensity of ionized particles travelling through a flight tube;
matching the spectrometer test data to a reference library to determine characteristic information of the sample,
wherein the reference library comprises spectrometer sample data in units of time and intensity of ionized particles of pre-stored reference samples detected by at least one spectrometer,
wherein the spectrometer reference data has known characteristics that the matching associates with the received spectrometer test data, and
wherein the matching processes the time-of-flight data without converting the time-of-flight data into units of mass-to-charge-ratio and intensity, thereby minimizing the spread of peaks associated with mathematical squaring in a quadratic operation when converting the time-of-flight data into units of mass-to-charge-ratio.

* * * * *